Figure 1:
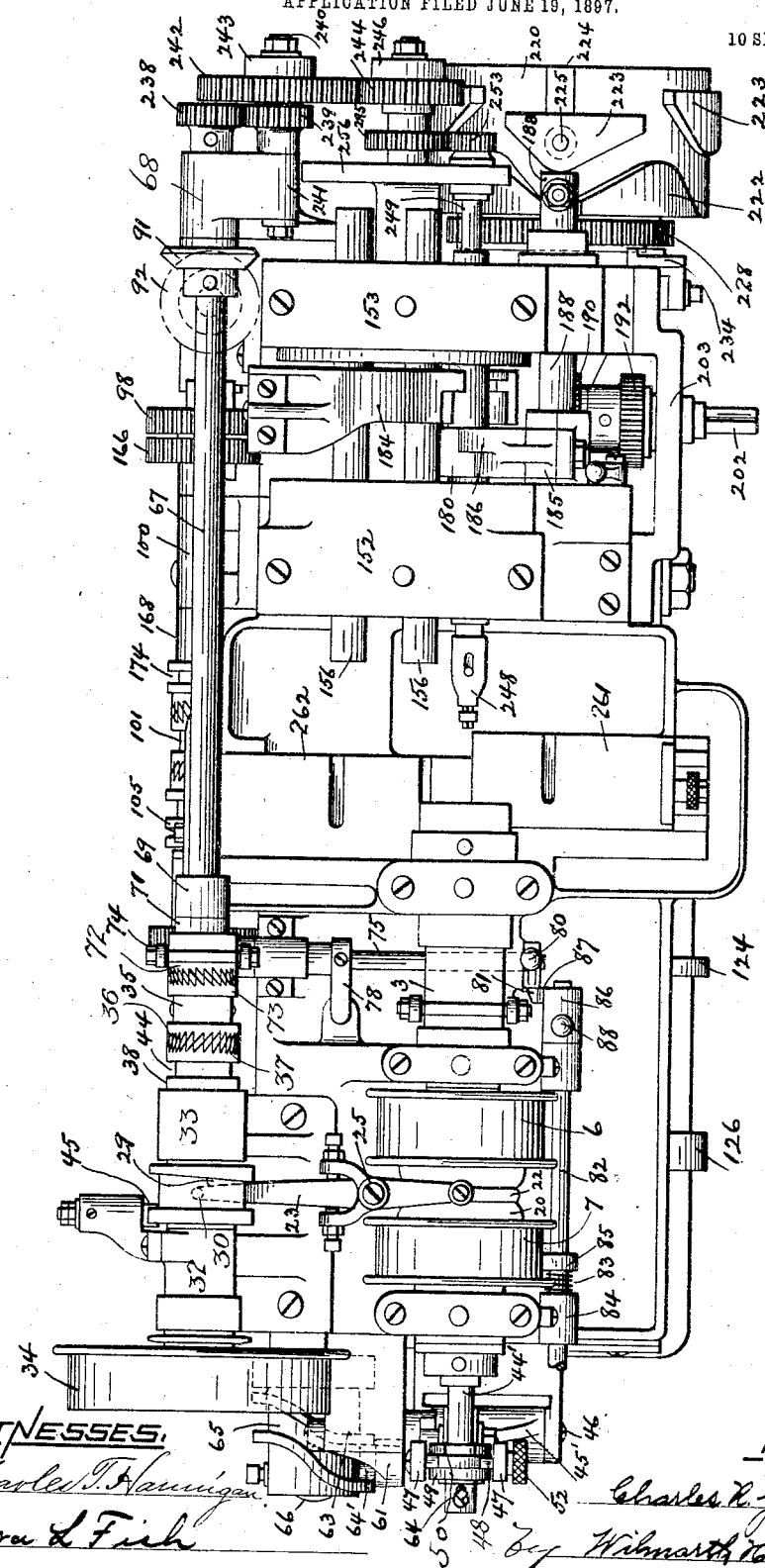

No. 786,353. PATENTED APR. 4, 1905.
C. R. GABRIEL.
SCREW MACHINE.
APPLICATION FILED JUNE 19, 1897.

10 SHEETS—SHEET 1.

WITNESSES:
Charles T. Hannigan
Ira L. Fish

INVENTOR.
Charles R. Gabriel
by Wilmarth H. Thurston
Atty.

No. 786,353. PATENTED APR. 4, 1905.
C. R. GABRIEL.
SCREW MACHINE.
APPLICATION FILED JUNE 19, 1897.

10 SHEETS—SHEET 5.

WITNESSES.

INVENTOR.
Charles R. Gabriel
By Wilmarth H. Thurston
Atty.

No. 786,353. PATENTED APR. 4, 1905.
C. R. GABRIEL.
SCREW MACHINE.
APPLICATION FILED JUNE 19, 1897.

10 SHEETS—SHEET 6.

WITNESSES.
Charles P. Hannigan
Ira L. Fish

INVENTOR.
Charles R. Gabriel
by Wilmarth H. Thurston
Atty.

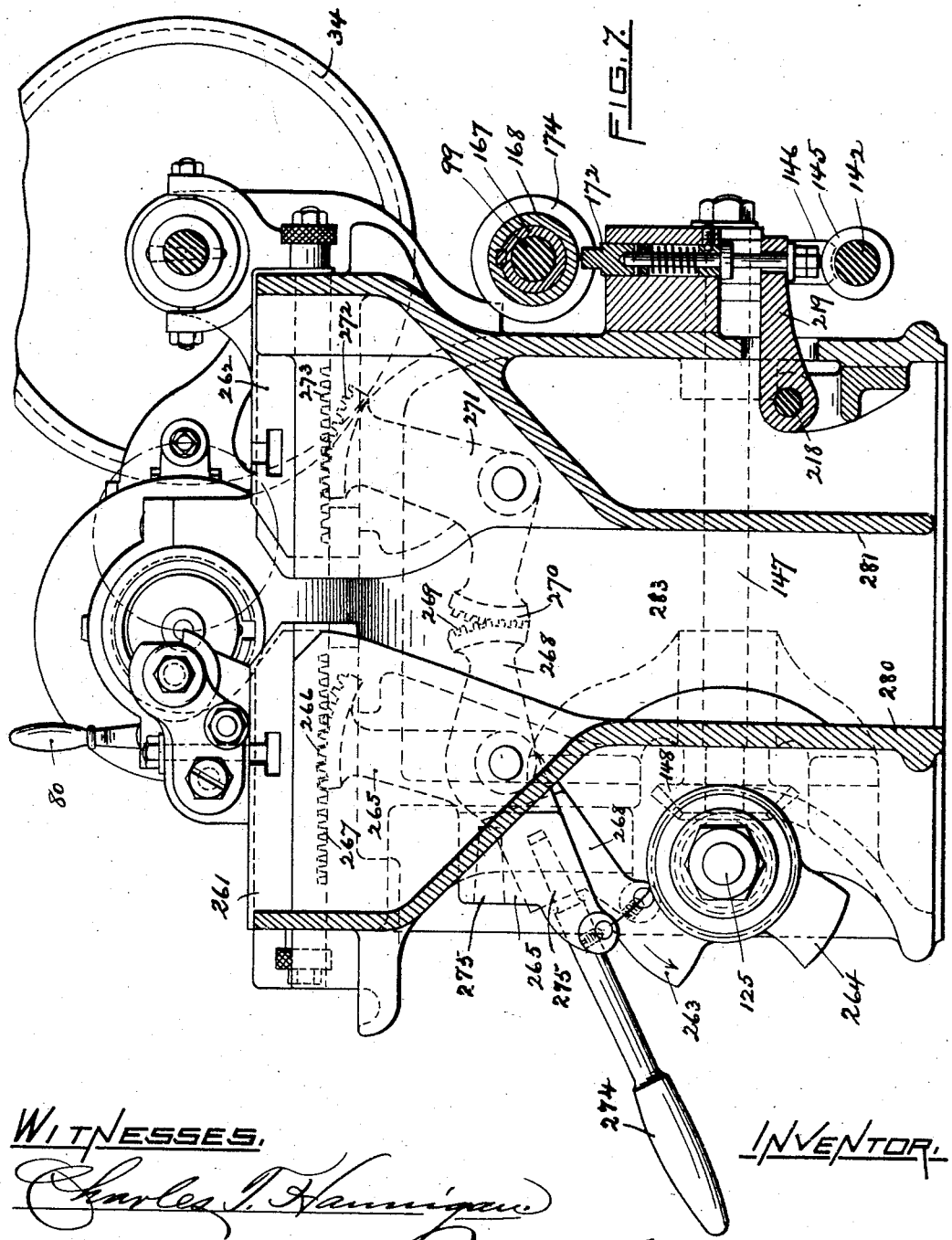

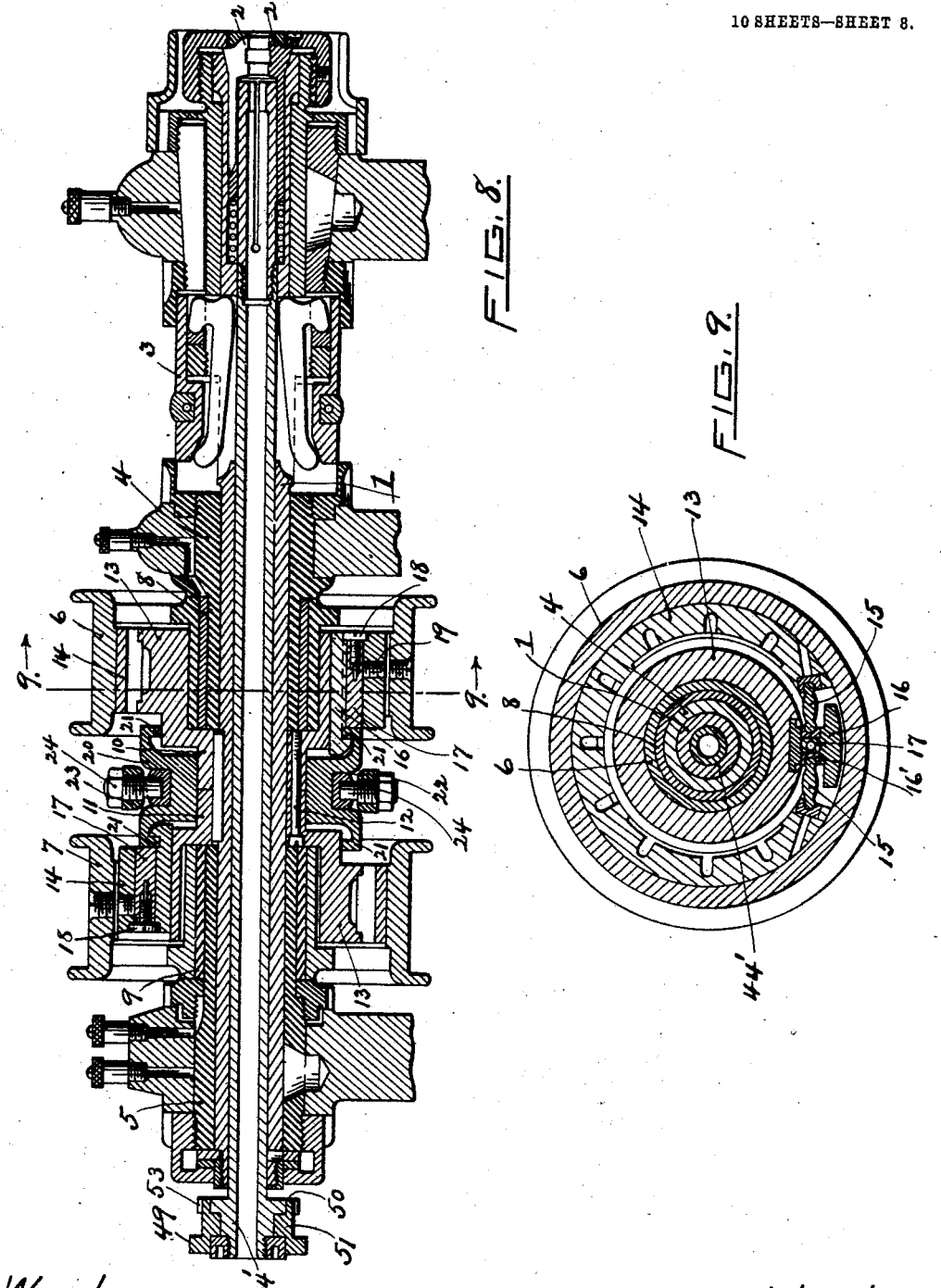

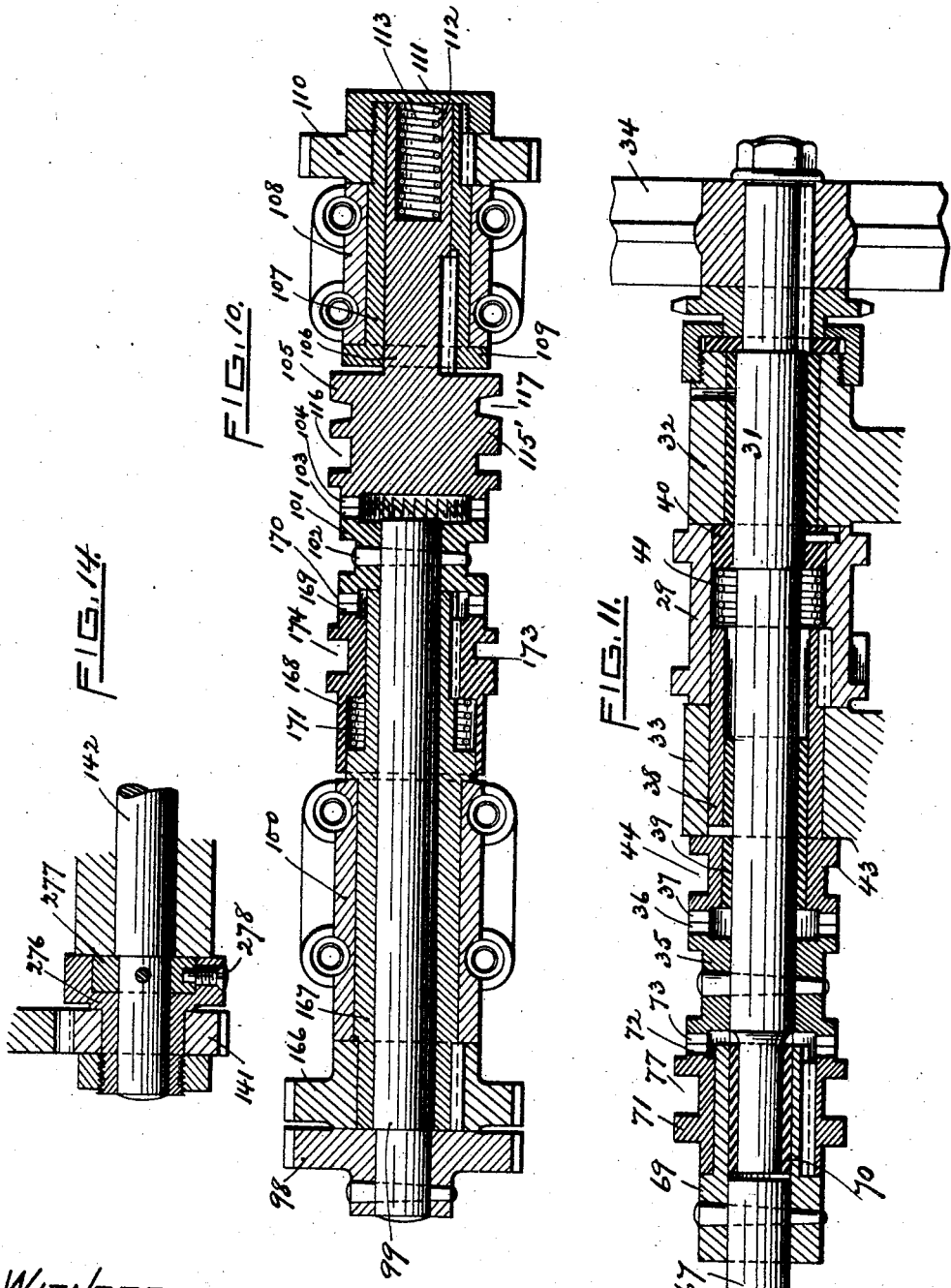

No. 786,353. PATENTED APR. 4, 1905.
C. R. GABRIEL.
SCREW MACHINE.
APPLICATION FILED JUNE 19, 1897.
10 SHEETS—SHEET 10.
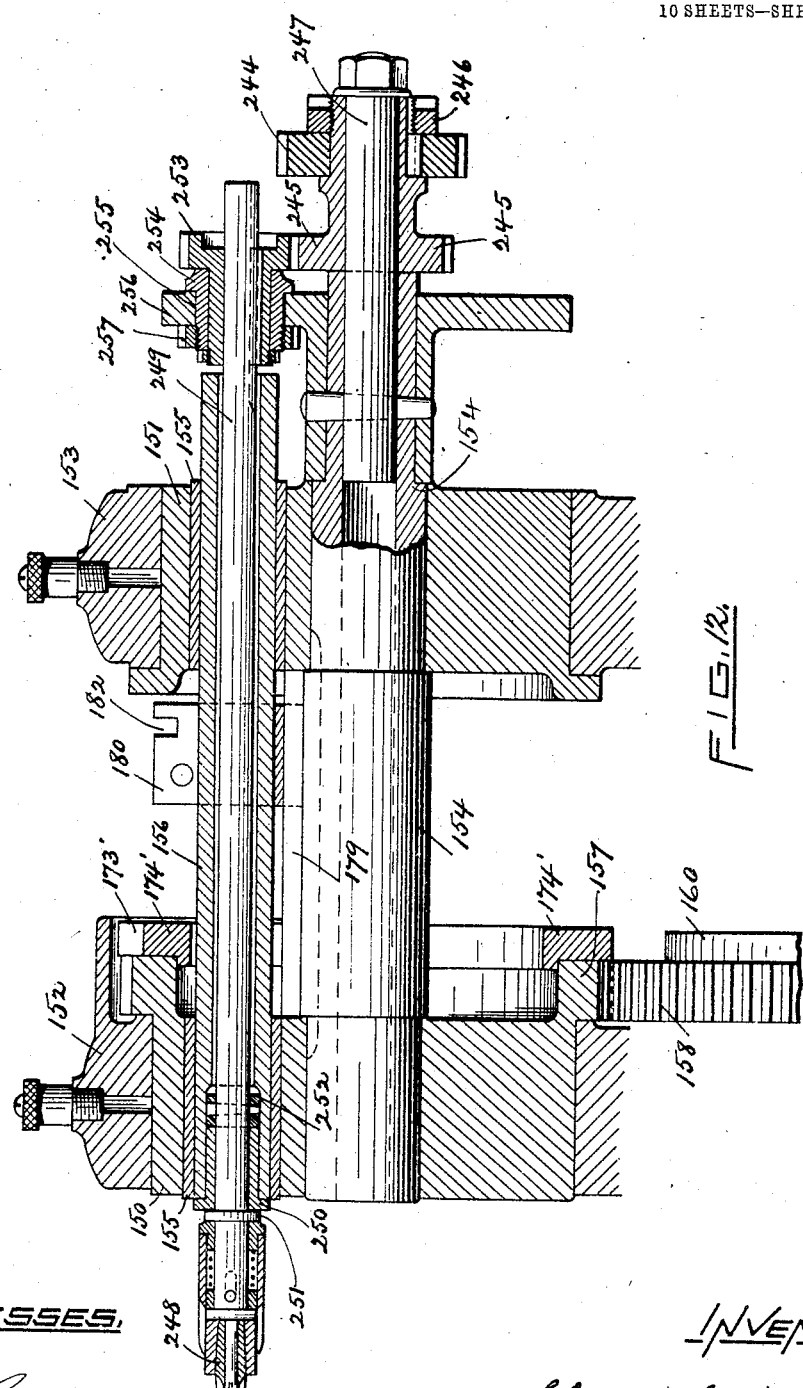

No. 786,353. Patented April 4, 1905.

UNITED STATES PATENT OFFICE.

CHARLES R. GABRIEL, OF PROVIDENCE, RHODE ISLAND, ASSIGNOR TO BROWN AND SHARPE MANUFACTURING COMPANY, OF PROVIDENCE, RHODE ISLAND, A CORPORATION OF RHODE ISLAND.

SCREW-MACHINE.

SPECIFICATION forming part of Letters Patent No. 786,353, dated April 4, 1905.

Application filed June 19, 1897. Serial No. 641,438.

*To all whom it may concern:*

Be it known that I, CHARLES R. GABRIEL, of Providence, county of Providence, and State of Rhode Island, have invented certain new and useful Improvements in Screw-Machines; and I do hereby declare the following specification, taken in connection with the accompanying drawings, forming a part of the same, to be a full, clear, and exact description thereof.

The present improvements relate to screw-machines, and are more especially applicable to that class of screw-machines in which a rod of stock is intermittently fed forward for the prescribed distance to form an article and is held by the jaws of the revolving chuck and successively acted on by a series of tools carried by a tool-holder.

In automatic screw-machines it has been customary to mount the tools in a turret-head which is indexed to bring the tools successively into line with the chuck-spindle and to reciprocate said turret-head to carry the tools toward and away from the chuck-spindle. This reciprocation of the heavy turret-head produces a wear and strain especially in rapid-running machines which is objectionable, and a further feature of the invention consists in supporting the tools upon spindles held in a turret-head which is mounted in stationary bearings and in automatically reciprocating said spindles in said turret-head to move the tools toward and away from the chuck-spindle. With such a construction the heavy turret-head has simply a rotary movement imparted thereto, while the tools are advanced and retracted by the reciprocation of light spindles accurately guided in the turret-head, and thus the machine can be run at a high rate of speed without material wear or strain upon the parts.

One feature of the invention consists in so constructing and arranging the indexing mechanism and the mechanism for reciprocating the tools that the forward movement of the tools to bring them up to the work may take place while the indexing is going on, with a consequent saving of time, and this feature of the invention is not limited to a machine in which the tools are carried by spindles reciprocated in the turret-head, but may be used with advantage in other forms of machines.

A further feature of the invention relates to means for reducing to a minimum the time which elapses between the operations of successive tools, and consists in providing two independent mechanisms for effecting the reciprocation of the tools, one of said mechanisms acting to slowly advance the tools during the cutting and the other mechanism acting to quickly return the tools to their rearward position. In case the machine is forming short articles, the tools must be advanced some distance before they begin to act upon the work, and it is therefore preferred to so construct the mechanism for rapidly returning the tools that it may also bring the tools up to the work. With such a construction the tools may be returned, indexed, and the succeeding tool brought up to the work while the slow-running mechanism is moving into position to again feed forward the tool, and the rapidity of operation and efficiency of the machine thus increased. While this feature of the invention is shown embodied in a machine in which the tools are reciprocated by reciprocating spindles in a turret-head, it will be understood that the invention is not limited to this form of machine, but may be embodied in machines in which the tools are reciprocated by reciprocating the turret-head or in machines in which the tools are carried by a holder, which is moved transversely to bring the tools into line with the work, or in other forms of machines.

The invention also includes certain other features and combinations which will be hereinafter referred to and set forth in the claims.

Figure 2:
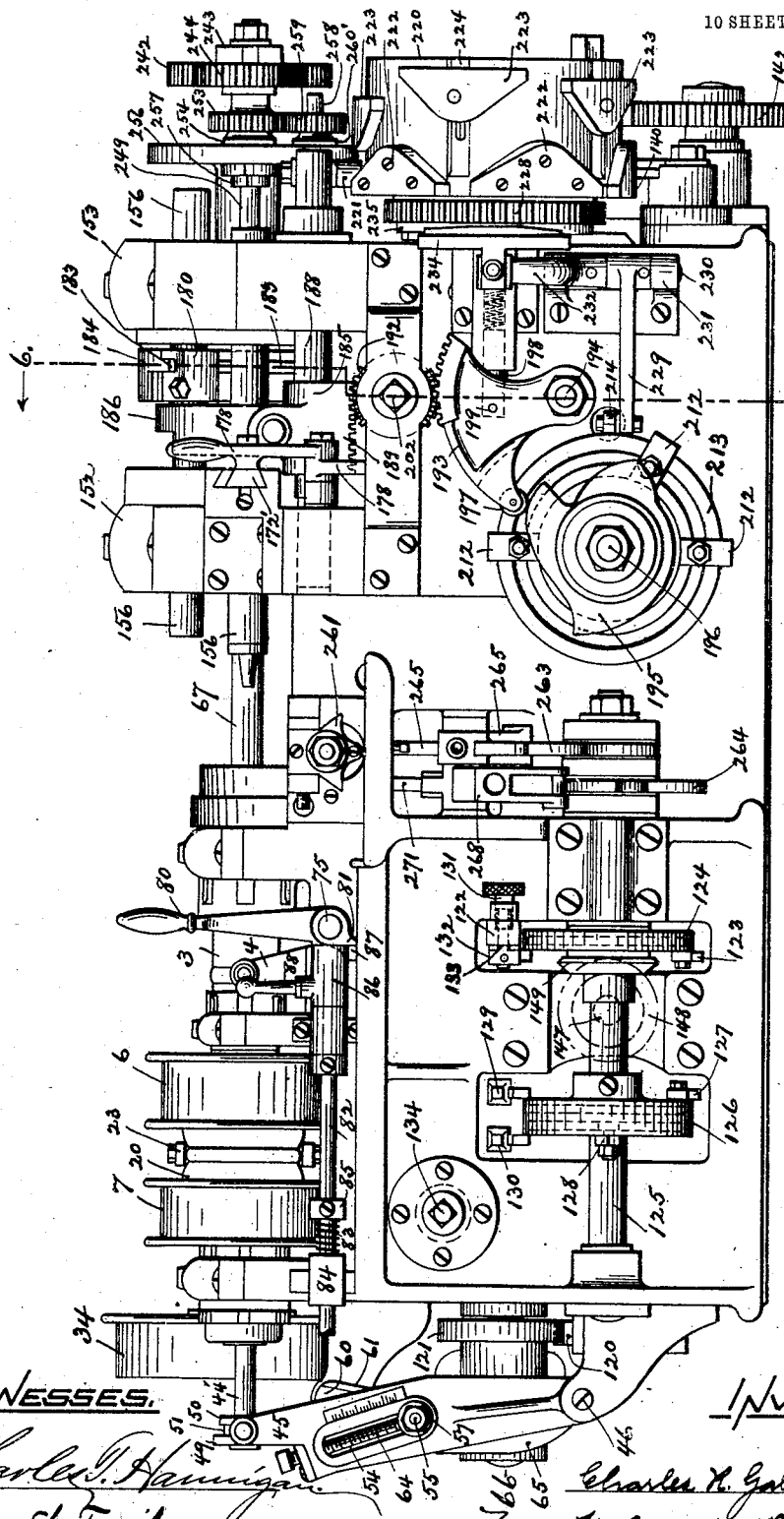
Figure 3:
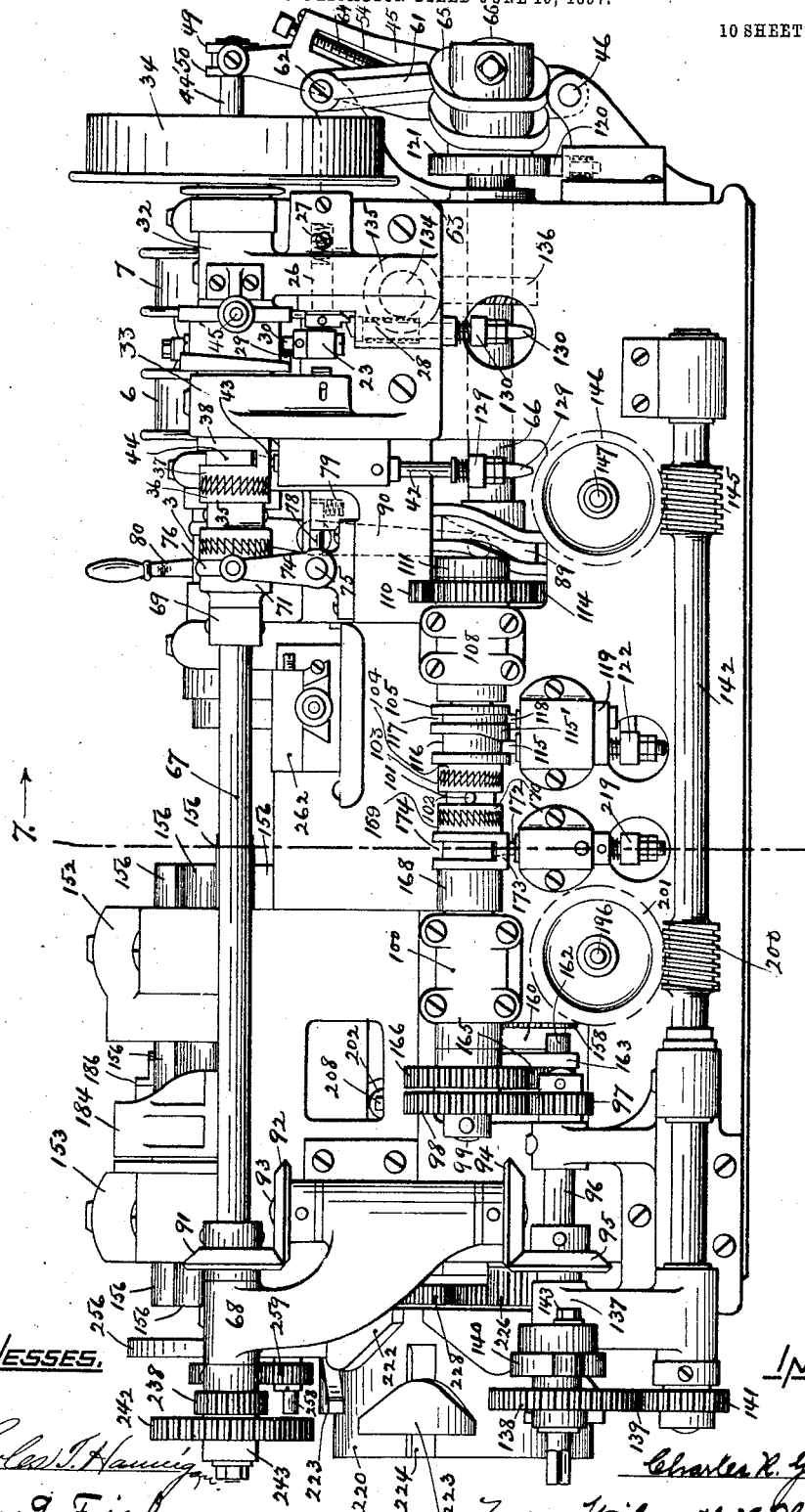
Figure 4:
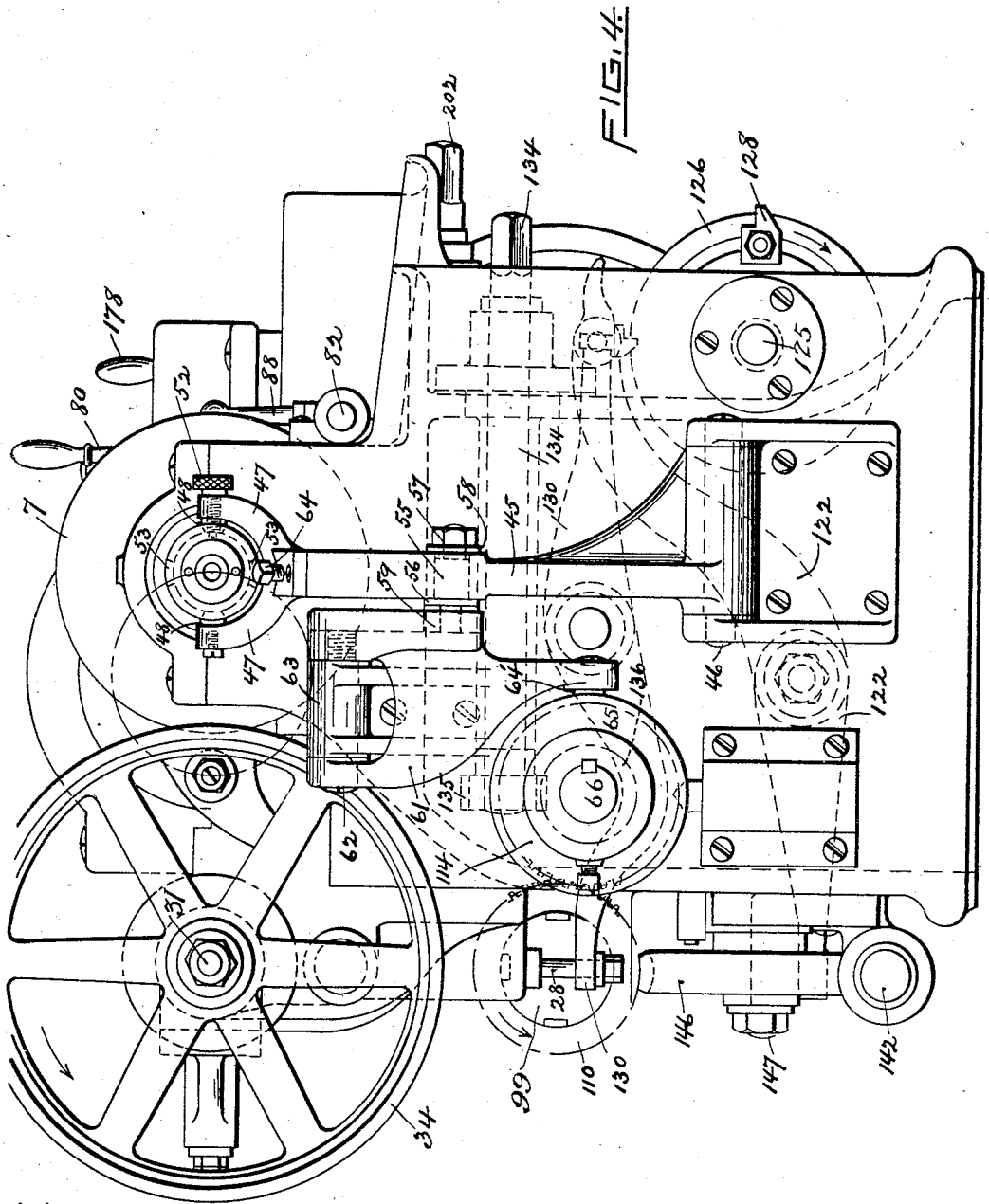
Figure 5:
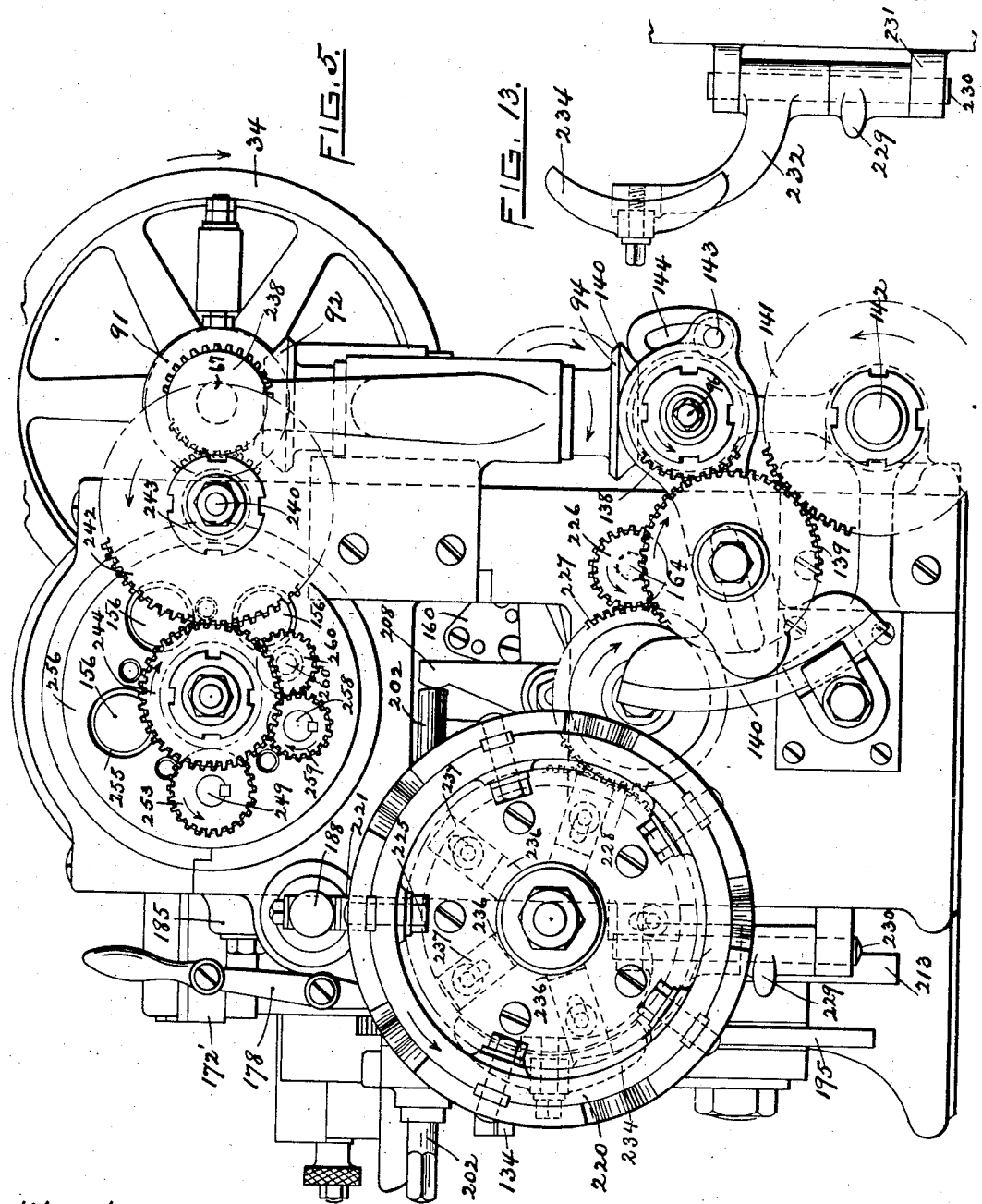
Figure 6:
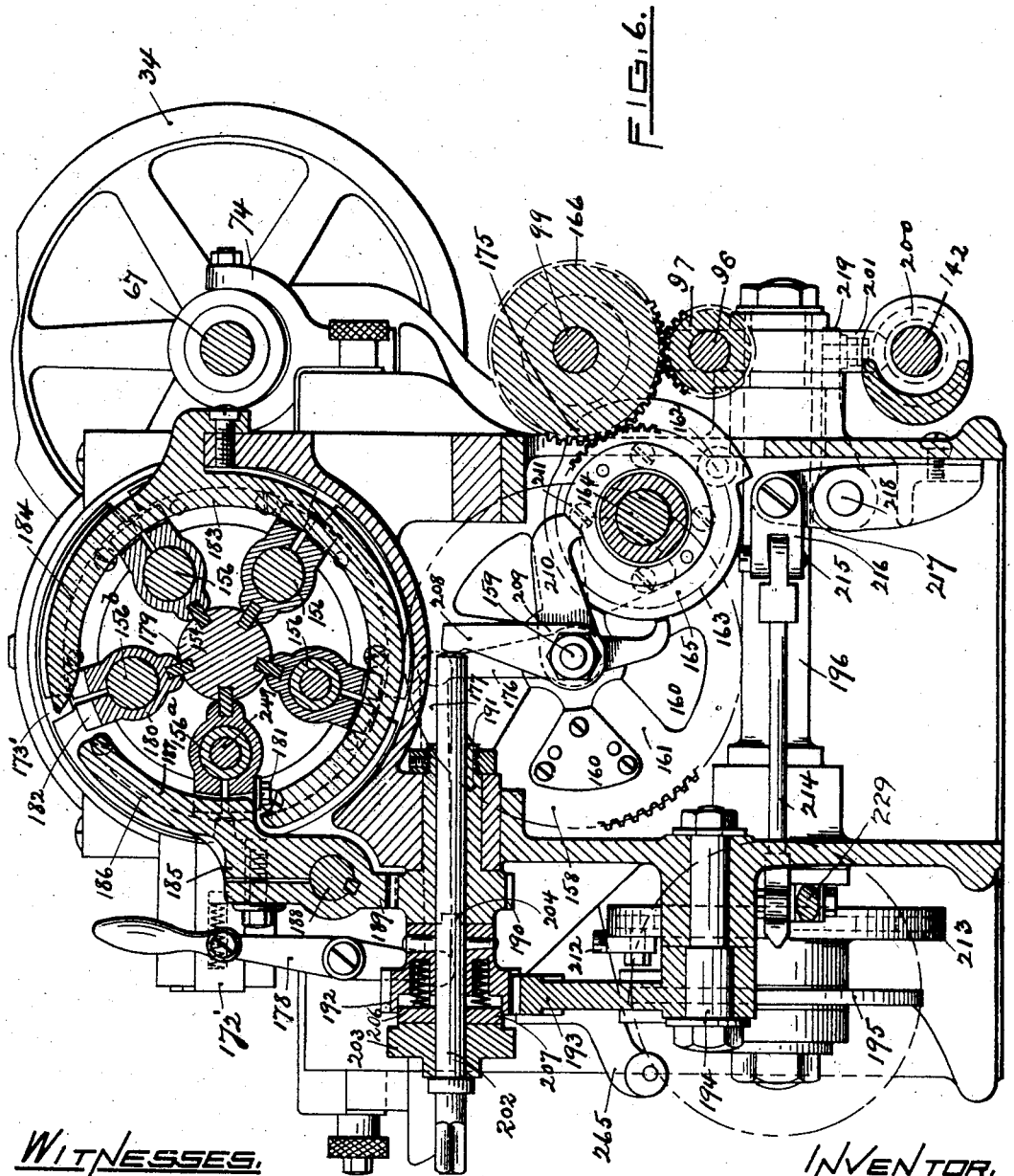

Referring to the drawings, Figure 1 is a plan view of an automatic screw-machine embodying all the features of the present invention in their preferred forms. Fig. 2 is a front elevation of the machine. Fig. 3 is a rear elevation. Figs. 4 and 5 are end elevations. Fig. 6 is a transverse sectional view on line 6 6, Fig. 2, with the carrier 185 in its rearward position. Fig. 7 is a transverse sectional view on line 7 7, Fig. 3. Fig. 8 is a longitudinal sectional view through the chuck-spindle. Fig. 9 is a transverse sectional view on line 9 9, Fig. 8. Figs. 10 and 11 are detail sectional views of the shafting at the rear of the machine. Fig. 12 is a sectional view of the turret-head. Fig. 13, Sheet 5, is a detail view showing the plate 234 to be described. Fig. 14, Sheet 9, is a detail view showing the manner of connecting the gear 141 to the worm-shaft.

The chuck-carrying spindle 1 is provided with the jaws 2, operated by the sliding sleeve 3, as fully set forth in Patent No. 543,606, dated July 30, 1895. The spindle passes through the bearings 4 and 5, Figs. 8 and 9, which are extended beyond their supports to form sleeves for supporting the pulleys 6 and 7, which are provided with the bushings 8 and 9 and revolve in opposite directions upon said sleeves, being held thereon by the sleeves 10 and 11, keyed to the spindle and secured together by the bolt 12. The sleeves 10 and 11 are provided with flanges 13, which surround the hubs of pulleys 6 and 7, and carry expansion-shoes 14, adapted to be forced against the flanges of said pulleys, and thus secure one or the other of said pulleys to the spindle. The shoes 14 are in the form of split spring-rings, and the ends of said rings are engaged by the toggle-arms 15, the inner ends of which engage slides 16, guided in the flanges 13. The ends of the arms 15 rest in shoes 16', carried by the slides 16, which shoes may be forced outward to adjust the rings 14 by means of wedges 17, operated by the screws 18 and held in adjusted position by the set-screws 19. The slides 16 are operated to expand either one or the other of the rings 14, and thus clutch either pulley 6 or 7 to the spindle by means of a sleeve 20, sliding on the sleeves 10 and 11 and provided with annular ribs 21, which engage recesses in the ends of slides 16. The sleeve 20 is provided with an annular recess, in which is mounted a ring 22, to which the ends of a yoke formed on lever 23 are connected by means of pivots 24, said lever being pivoted at 25, Fig. 1, and operated by means to be described to shift the sleeve 20 and clutch either pulley 6 or 7 to the shaft. By thus mounting the pulleys upon stationary sleeves surrounding the spindle instead of upon the spindle itself the lateral strain upon said spindle due to the tension of the belts is removed, and said spindle may be run at a higher rate of speed and with less wear upon said spindle and its bearings. Moreover, by thus mounting the pulleys the spindle is relieved of the friction thereon due to the idly-running pulley, which is revolving in the opposite direction from the spindle.

In cutting threads up to a shoulder or for a fixed distance it is desirable that the direction of rotation of the spindle should be changed instantaneously to run off the die, and in the case of a short thread and with the spindle running at a high rate of speed the die is run off almost instantaneously, and in such case to prevent loss of time the direction of rotation of the spindle should be again changed as soon as the die has run off. To accomplish this result, mechanism is provided for operating the shifting lever 23, which is adapted to instantly move said lever in one direction and immediately return said lever to its normal position, which mechanism is as follows: The rear end of lever 23 is in the path of a bolt 26, pressed outward by a spring 27, Fig. 3. The bolt is held retracted and the spring compressed by a spring-catch 28, which is operated at the proper time by means to be described to release the bolt 26 and allow the spring 27 to instantly shift the lever 23 to reverse the rotation of the spindle. The lever 23 is moved in the opposite direction to change the direction of rotation of the spindle and to energize the spring 27 by means of a cam 29, arranged to engage a pin 30 on the end of said lever. The cam 29 is normally stationary, but is revolved for a single revolution at the proper times by the following mechanism: A shaft 31, supported in bearings 32 and 33, is constantly revolved by means of a pulley 34 and carries a collar 35, secured thereto by a pin, Fig. 11. The collar 35 is provided with a clutch-face 36, adapted to be engaged by a clutch-face 37, formed on a sleeve 38, which extends through bearing 33 and to which the cam 29 is connected by a key. A bushing 39 is pinned in the sleeve 38 and forms a bearing in which the shaft 31 normally revolves. A bushing 40 is pinned within the cam 29 and a spring 41 is interposed between the end of sleeve 38 and bushing 40 and tends to force the clutch-face 37 into engagement with the revolving clutch-face 36. The sleeve 38 is held in its normal position by means of an abutment in the form of a spring-pressed bolt 42, which engages a cam-surface 43, formed on the side of a groove 44, which extends nearly around the sleeve 38. When the bolt 42 is withdrawn by mechanism to be described the spring 41 forces the clutch-faces 36 and 37 into engagement and the cam 29 is revolved with the shaft 31 and the lever 23 is operated and the bolt 26 retracted. When the cam 29 has made one revolution, the cam 43 engages the bolt 42, which has meanwhile returned to its normal position and forces the sleeve 38 back against the spring 41 and disengages the clutch-faces 36 and 37, the end of groove 44 engaging the bolt 42 and preventing further rotation of sleeve 38. A spring locking-pin 45' engages a notch in the cam 29 and holds said cam in its normal position, the point of said pin being beveled at such an angle that the rotation of the cam will disengage it.

The feeding-tube 44', which is provided with the usual spring-fingers for gripping the stock, is reciprocated within the spindle to feed forward the required length of stock by the following mechanism, Figs. 1, 2, 3, 4, and 8. An arm or lever 45 is pivoted at 46 to the frame of the machine and is provided at its upper end with a yoke, the arms 47 of which straddle the end of feeding-tube 44'. The arms 47 carry shoes 48, which work in a groove formed by the flanges 49 and 50 on the collar 51, mounted on the end of tube 44'. A screw 52 passes through one arm 47 and shoe 48 and engages a recess in the collar 51 and prevents the rotation of said collar. The flange 50 is provided with two notches 53. By turning the screw 52 to disengage the collar 51 said collar may be turned to bring the notches 53 in line with the shoes 48, when the feeding-tube may be removed. The lever 45 is provided with a slot 54, through which a stud 55 passes. The stud 55 is provided with a flange 56, which engages one face of the lever 45 and is turned down at its other end and carries a nut 57 and washer 58, by which said stud is secured in position in said slot. The stud extends beyond the flange 56 and forms a pivot for engaging a block or shoe 59, which works in a groove 60, formed in a lever 61, pivoted at 62 to a bracket 63. A screw-rod 64 passes through the stud 55 and serves to adjust said stud, and thus vary the pivotal connection between the levers 45 and 61. The lower end of lever 61 carries a roll 64', which is operated on by a cam 65, carried by an intermittently-operated cam-shaft 66. By adjusting the pivotal connection between the levers 45 and 61 the throw of the lever 45 may be varied and the length of stock fed forward at each reciprocation of the feed-tube correspondingly varied, and by so arranging the slot 54 and groove 60 that they shall be parallel when the levers are at the forward limit of their throw the tube 44' will be moved forward to the same position whatever the length of the reciprocation of said tube. With the above construction, in which there is no lost motion between the parts, the feed-tube is started forward without the sudden jar which occurs when there is lost motion between the parts, and a more accurate and efficient feed of the stock is insured.

When the machine is operating automatically, motion is transmitted from the pulley 34 to the various mechanisms of the machine other than the spindle and mechanism for shifting the lever 23 by means of a main driving-shaft 67, Figs. 1, 2, 3, and 11. One end of shaft 67 is supported in a bearing 68, and the other end of said shaft has secured thereto a collar 69, which extends beyond the end of said shaft and is provided with a bushing 70, which fits over the end of shaft 31. A sleeve 71 is keyed to the collar 69 and is provided with a clutch-face 72, arranged to engage a clutch-face 73 on collar 35, secured to shaft 31. When the machine is operating automatically, the clutch-faces 72 and 73 are in engagement and the shaft 67 is revolved continuously. When, however, it is desired to operate the turret-tools or the cross-slides by hand and to control the reversal of the spindle by hand—as, for instance, when adjusting the machine for a new piece of work—the clutch-face 72 is held out of engagement with clutch-face 73 by means of a yoke 74, secured to a rock-shaft 75 and having the ends of its arms pivoted to a collar 76, mounted in a groove 77 in the clutch-sleeve 71. An arm 78 is secured to the rock-shaft 75 and is acted on by a spring 79. The shaft 75 extends to the front of the machine and is provided with an arm 80, having a depending toe 81. A shaft 82 extends at right angles to the shaft 75 and is acted on by a torsional spring 83, which has one end connected to the bearing 84 and the other to a collar 85, secured to shaft 82. A collar 86, provided with a depending lug or toe 87, is secured to the end of shaft 82, said lug 87 being arranged to move behind the toe 81 when the arm 80 is moved to throw the clutch-face 73 into engagement and hold said clutch in engagement. When it is desired to throw the automatic mechanism of the machine out of operation, the shaft 82 is rocked by means of a handle 88 secured thereto, and the lug 87 is moved out of the path of the toe 81 and the spring 79 rocks shaft 75 and disengages clutch 72. When the clutch 72 is out of engagement, the shaft 31 runs loosely in the bushing 70 and said shaft forms a support for the end of shaft 67.

The cam-shaft 66 carries a cam 89, which actuates the slide 3 through a lever 90, and said shaft is given a single revolution at the proper time to operate the jaws of the chuck and feed forward the stock by the following mechanism, Figs. 3 and 10: A bevel-gear 91 is secured to shaft 67 and engages a bevel-gear 92 on a short vertical shaft 93, which has a second bevel-gear 94, secured to its lower end. The gear 94 engages a bevel-gear 95 on a shaft 96, which carries a pinion 97, secured thereto. The pinion 97 engages and drives a gear 98, secured to the end of a short shaft 99, supported by the bearing 100. A collar 101 is secured to the end of shaft 99 by a pin 102 and is provided with a clutch-face 103, arranged to be engaged by the clutch-face 104, formed on a stud 105. The stud 105 is turned down at 106 and is keyed to slide in a sleeve 107, mounted in bearing 108. The sleeve 107 is provided with a flange 109, which engages one end of bearing 108, and a gear 110 is keyed to the other end of said sleeve. A cap 111 is secured over the end of sleeve 107 and serves to hold the sleeve in position in the bearing. The stud 105 is recessed at 112 to receive a spring 113, which bears against the bottom of said recess and the cap 111 and tends to force the clutch-face 104 into engagement with clutch-face 103. The gear 110 engages a gear 114 of equal size, Figs. 3 and 4, secured to the cam-shaft 66. The clutch-face 103 is held normally out of engagement by an abutment in the form of a spring-pressed bolt 115, which engages a cam 115', formed on one side of a groove 116 in the stud 105. The stud 105 is provided with a second annular groove 117, which is engaged by a spring-pressed bolt 118 for a purpose to be described. An arm 119 is secured to bolt 115 and engages the head of bolt 118, so that bolt 118 will be withdrawn whenever bolt 115 is withdrawn. When the bolts 115 and 118 are withdrawn by means to be described, the spring 113 forces the clutch-face 104 into engagement with clutch-face 103, and the stud 105, and consequently cam-shaft 66, are given a single revolution, the clutch-face 104 being disengaged after one revolution by the engagement of cam 115' with the bolt 115. A spring-pressed locking-pin 120 engages a notch in a disk 121, secured to cam-shaft 66, and prevents said shaft overrunning and holds said shaft in its normal position, the point of said pin being beveled at such an angle that the rotation of the cam will disengage it.

The bolt 115 is withdrawn at the proper time by means of a lever 122, which extends transversely of the machine and has its rear end connected with said bolt. The front end of said lever is acted on by a tappet 123, adjustably secured in an annular undercut groove formed in the disk 124, secured to the front shaft 125, Fig. 2. The shaft 125 also carries a second disk 126, which is provided with an undercut groove in each face in which are secured tappets 127 and 128 for acting upon the front ends of levers 129 and 130, respectively. The rear end of lever 129 is connected with the bolt 42, and the rear end of the lever 130 is connected with the bolt 28. By adjusting the tappets 127 and 128 the direction of rotation of the spindle and the operation of the chuck-jaws and the feeding of the stock may be controlled as desired. If it is desired to rotate the spindle continuously in the same direction, one or both of the tappets 127 and 128 may be turned inward, so that they will not engage the levers 129 and 130.

Suppose the machine to be running and one article to have been completed and severed from the rod of stock. The tappet 123 on the disk 124 strikes the end of lever 122, thus withdrawing the bolts 115 and 118, so that the clutch-faces 103 and 104 are engaged and the cam-shaft 66 is given a single revolution. During this revolution the cams on the cam-shaft act to open the chuck-jaws, then feed the stock, then close the jaws upon the stock, and, finally, to return the feed-levers to normal position. The shaft 125 is continuously driven, and the lever 122 is operated after the completion of each article. If during the forming of an article the direction of rotation of the spindle is to be reversed, the tappets 128 and 127 are secured to the disk 126 in the proper relation, and at the proper time tappet 128 operates lever 130, thus releasing the spring-bolt 26, which shifts the clutch-lever 23 to reverse the spindle, and then tappet 127 operates lever 129, thus allowing clutch-faces 36 and 37 to become engaged, so that cam 29 is given a revolution, thus returning the clutch-lever to normal position.

It is frequently desirable to operate the feed of the stock manually while the other operations of the machine are performed automatically, and means are accordingly provided whereby the automatic means for controlling the operation of the cam-shaft 66 may be thrown out of operation and the shaft manually revolved. For quickly and conveniently throwing the automatic mechanism for operating the cam-shaft out of operation the end of lever 122 is provided with a spring-pressed stud 131, which carries a collar 132, provided with a depending toe arranged to be engaged by the tappet 123. The collar 132 is provided with a lug 133, which is normally in engagement with a notch in the side of lever 122. By pressing the end of stud 131, however, the lug may be disengaged from the notch and the stud turned to move the toe out of the path of the tappet 123, so that the lever 122 will not be operated thereby. For manually operating the shaft 66 when the automatic feed is thus thrown out or when setting the machine for a new piece of work a cross-shaft 134, provided with a squared end for the reception of a crank-handle, is mounted in suitable bearings and carries a spiral gear 135, engaging a spiral gear 136, secured to shaft 66, Figs. 3 and 4. When the shaft 66 is revolved by the shaft 134, the stud 105 will also be revolved and the cam 115' carried out of engagement with bolt 115, the bolt 118 at this time serving to hold the said stud against the action of the spring 113.

The shaft 125 is driven continuously through the following gearing, Figs. 2, 3, 5, and 7: The shaft 96 extends through the bearing 137 and carries a gear 138, which engages an intermediate gear 139, carried by a stud adjustably mounted in a slot in an arm 140, pivoted on the shaft 96, said gear 139 engaging a gear 141, secured to the end of a worm-shaft 142. By changing the relative sizes of the gears 138 and 141 the speed of the worm-shaft 142 may be changed. The arm 140 is secured in position by a bolt 143, which passes through a slot 144 in an arm projecting from bearing 137. A worm 145 is formed on the shaft 142 and engages a worm-wheel 146 on a cross-shaft 147, said shaft carrying at its forward end a bevel-gear 148, which engages a bevel-gear 149 on shaft 125.

As illustrated in the drawings, the tool-holder consists of a turret-head having its axis parallel to the axis of the chuck-spindle, and the tools are secured to or supported by a series of spindles mounted in the turret-head parallel to its axis, the turret-head being intermittently revolved a partial revolution or indexed to bring the spindles successively into operative relation to the chuck-spindle and the spindles being reciprocated in the turret-head to move the tools to and from the chuck-spindle. With this construction the heavy turret-head has merely a rotary movement, while the tools are carried forward and back by the reciprocation of light tool-spindles, and thus the machine will operate more accurately and with less wear and at a higher rate of speed than machines in which the heavy turret-head is reciprocated as well as indexed.

As shown, the turret-head comprises two disks 150 and 151, mounted to revolve in housings 152 and 153 and secured to the short shaft 154, Fig. 12. A series of bushings 155 are driven into holes formed in the disks 150 and 151 and serve as bearings to accurately guide the spindles 156, to which the various cutting-tools may be attached. The turret-head is indexed by the following mechanism, Fig. 6: A gear 157 is secured to or formed upon the disk 150 and is engaged by a gear 158, mounted on a stud 159. The gear 158 is a disk-gear and has secured to its face a series of plates 160, the spaces between said plates forming a series of radial slots or grooves 161 equal in number to the number of tool-spindles in the turret-head. A crank-roll 162 on a disk 163, secured to a shaft 164, is arranged to engage the slots 161 successively and give the turret-head a partial revolution. A gear 165 is secured to the disk 163 and is engaged and driven by a gear 166, secured to a sleeve 167, surrounding the shaft 99 and extending through bearing 100, Figs. 3 and 10.

The sleeve 167 is turned down beyond the bearing 100 and carries a collar 168, provided with a clutch-face 169, arranged to engage a clutch-face 170 on collar 101, the collar 168 being forced toward collar 101 by a spring 171. (See Fig. 10.) The collar 168 is normally held against the tension of the spring 171 by means of a spring-bolt 172, which engages a cam 173, formed on one side of a groove 174, which extends partially around said collar. When the bolt 172 is withdrawn by means to be described, the sleeve 167 is driven for one revolution and then the clutch-faces 169 and 170 are disengaged, as above explained, with relation to clutch-faces 36 and 37. This rotation of the sleeve 167 and gear 166 rotates the disk 163 and causes the roll 162 to enter one of the slots 161 and give the turret-head a partial revolution. The roll 162 enters and leaves the slots 161 in a direction substantially radial to the gear 158, and motion is imparted to the turret-head without any jar or shock either in starting or stopping, the speed of rotation gradually increasing as the roll moves toward the center of the gear 158 and gradually decreasing as the roll moves away from the center of the gear. This arrangement also allows the turret-head to remain locked until the roll enters the groove 161 and the turret-head is under the direct control of the indexing mechanism and to be again locked before the roll leaves the slot 161 and the turret is released from said control, with the result that said turret-head is always positively held, and perfect timing and accuracy of operation is insured.

The turret-head is locked in position after each forward movement by means of a spring-pressed sliding bolt 172', which engages a series of notches 173', formed in a ring 174', secured to the disk 150. The bolt 172' is withdrawn just after the roll 162 enters a slot 161 by means of a cam 175, formed on disk 163, acting through the lever 176, link 177, and lever 178. The cam 175 releases the bolt 172' just before the roll 162 leaves the slot 161, and said bolt is forced into one of the recesses 173' by the action of its spring.

The spindles 156 are held from rotation in the turret-head by means of a series of keys 179, secured to the shaft 154, which engage grooves formed in split collars 180, clamped upon said spindles by means of bolts 181. The collars are also provided with grooves 182 at right angles to the axis of the turret-head which engage a rib 183, formed on the inner surface of a segmental guide-ring 184, said rib serving to hold the inactive spindles in their retracted position and to guide said spindles during the indexing of the turret. The spindles are reciprocated in the turret-head by means of a carrier 185, which is provided with a segmental arm 186, which substantially fills the space between the end of the guide-ring 184 when said carrier is in its rearward position. The arm 186 is provided with a rib 187, which registers with the rib 183 and which is engaged by the groove 182 of the spindles as they are successively brought into operative position. The carrier 185 is secured upon a rod 188, guided in the frame, and is provided with a rack 189, which is engaged by a pinion 190, formed on the end of a stud 191, journaled in the frame. The pinion 190 is connected to revolve with a second pinion 192, which is engaged and operated by gear-teeth formed on a segment 193, pivoted at 194, Fig. 2. The segment 193 is operated by a cam 195, secured upon the end of a cross-shaft 196, which engages a roll 197, carried by said segment, the roll being held in engagement with the cam by a spring-plunger 198, which engages a block 199, pivoted to the segment. The shaft 196 extends transversely across the machine and is driven continuously from the shaft 142 by means of a worm 200 on shaft 142, which engages a worm-wheel 201 on shaft 196, Fig. 3. The return movement of the tool-spindles and their movement to bring the tools up to the work, as well as their movement to carry the tools along the work during the cutting operation, may be effected, if desired, from the cam 195, acting through the connections described or any other suitable connections. In such case after the roll reaches a high point of the cam 195 and the cutting operation is completed the cam must revolve far enough to allow the roll to roll over such high point and pass low enough to bring the tool to its rearward position before the indexing can be begun, and then the indexing must take place and the roll ride up a swell of the cam far enough to bring the tool up to the work before the cutting operation can begin, and as the shaft 196 must be a comparatively slow-running shaft in order to operate the tools properly during the cutting operation there will be considerable time consumed in thus returning the tools, indexing, and bringing the next tool up to the work, especially in forming short articles. It is therefore preferred to use the slow-running cam for operating the tools during the cutting operation only and to provide independent and more rapidly operating mechanism to return the tools to their rearward position, and it is also preferred to so construct this mechanism that it will also move the tools up to the work. With such a construction the tools are returned, indexed, and the next tool brought up to the work while the roll is passing over the high point of the cam and passing low enough to bring it into proper position to operate the tool during the cutting operation, and the rapidity of operation is thereby increased. The preferred form of such construction shown in the drawings is as follows: The pinion 192 is secured to a shaft 202, extending through the stud 191 and a bearing 203, and the hub of said pinion is provided with a projecting lug 204, arranged to engage a notch in the hub of pinion 190 and connect said pinions, Fig. 6. The pinion 192 is pressed toward the pinion 190 by a series of springs 206, which are held in recesses in said gear and bear against a disk 207, said pinion being recessed to overlie said disk. The shaft 202 extends beyond the stud 191 and is engaged by one arm, 208, of a bell-crank lever 209, the other arm, 210, of which engages a cam 211, secured to the gear 165. When the bolt 172' is withdrawn and the gear 165 begins its rotation, which occurs immediately the roll 197 arrives at a high part of the cam 195, the cam 211 rocks the lever 209 and the shaft 202 is forced back to withdraw the lug 204 from the notch in pinion 190, and thus disconnect said pinion and pinion 192. The bolt 172' is withdrawn or tripped at the proper time by a series of tappets or cams 212, adjustably secured in an undercut annular groove in a disk 213, which engage an incline on the end of a bar 214, pivoted at 215 to a link 216, the other end of which is pivoted to an arm 217, secured to a rock-shaft 218. An arm 219 extends from rock-shaft 218 and is connected with the spring-pressed bolt 172'. When one of the tappets 212 engages the end of bar 214, said bar is forced back, the shaft 218 rocked, and the bolt 172' withdrawn. When the cam 195 is rendered inoperative to move the carrier 185 by disconnecting pinions 190 and 192, the mechanism for quickly returning the tools to the indexing position and moving the succeeding tool up to the work is brought into operation, which mechanism in the form shown consists of a series of cams secured to a drum 220 and arranged to operate upon a roll 221, secured to the rear end of rod 188, Figs. 1, 2, 3, and 5. A series of cams 222 equal in number to the number of tools carried by the turret-head are secured to drum 220 and operate to return the tools to their rearward position. A second series of cams 223 are adjustably secured in grooves 224 in the drum 220 by means of bolts 225 passing through slots in said drum, said cams serving to move the tools from their rearward position up to the work and being adjusted to give more or less forward motion according as the article being formed is short or long. The drum is given a partial revolution at the proper time by means of a pinion 226, secured to the end of the shaft 164 and engaging an intermediate gear 227, which meshes with a gear 228, secured to the drum 220.

Supposing the parts to be in the position shown in Figs. 1, 2, and 6, with one of the tools being moved forward by the action of the cam 195, the operation is as follows: As the roll 197 reaches the high point of the cam 195 and the forward movement of the tool is completed one of the tappets 212 engages the end of rod 214 and forces the rod rearward. This movement of the rod rocks the shaft 218, so that arm 219 withdraws the bolt 172 from engagement with the cam 173. The collar 168 is now moved by the spring 171, so that the clutch-face 169 engages the clutch-face 170 on the continuously-rotating collar 101. The collar 168 and the connected sleeve 167 and gear 166 now make one revolution, and then the collar is forced back by the engagement of the cam 173 with the bolt 172, which has meanwhile returned into the path of the cam. Thus gear 165, which is engaged by gear 166, is given a single revolution and then stops and remains at rest until the bolt 172 is again withdrawn. As the gear 165 starts forward the cam 211, acting through bell-crank lever 209, forces shaft 202 longitudinally, thereby disconnecting the pinions 190 and 192. The rotation of gear 165 also causes the drum 220 to revolve. By the time the gear 165 has revolved far enough to bring the roll 162 into one of the slots 161 one of the cams 222 has withdrawn the tool-carrier 185 into its rearward position, and the rib 187 is in register with the rib 183. Just as the roll 162 enters the slot 161 the cam 175 withdraws the locking-bolt 172' and the turret-head is rotated, carrying the spindle 156ª, Fig. 6, out of engagement with the carrier 185 and into engagement with the guide-ring 184 and carrying the spindle 156ᵇ into engagement with the arm 186 of the carrier. As soon as the spindle 156ª has become disengaged from the carrier 185 and before the indexing is completed the carrier may be moved forward and will be so moved unless the machine is making long articles by the action of one of the cams 223, the time at which said forward movement begins depending on the adjustment of the said cam 223. As the roll 162 is about to leave the slot 161 the cam 175 releases the locking-bolt, which enters one of the notches 173' and locks the turret-head. As the gear 165 completes its revolution and comes to rest the cam 223 has moved the tool-spindle 156ᵇ forward to bring the tool up to the work. In the meantime the cam 195 has revolved far enough to allow the roll 197 to pass over the high part of the cam and into a low part of said cam, and as the rotation of the gear 165 and drum 220 is completed the lug 204 will register with the notch in pinion 190 and the pinion 192 will be engaged with said pinion 190 by the springs 206. The spindle 156ᵇ will now be moved forward by the cam 195 to feed the tool during the cutting operation and until the roll 197 again reaches a high point of the cam 195, when the same cycle of operations will be repeated.

As shown in the drawings, the turret-head carries five tool-spindles, and in case all of said spindles are to be used a cam 195 will be used provided with five lobes, and five tappets 212 will be secured to the disk 213, and a spindle 156 will be reciprocated after each indexing of the turret-head. In case, however, less than the whole number of spindles are used—as, for instance, three—then the cam 195 will have but three lobes, as shown in Fig. 2, and two of the cams 223 will be moved back so that they will not act upon the roll 221, and the turret-head will be indexed three times in rapid succession. This may be done by properly adjusting the tappets 212 so that the bolt 172' will be tripped three times in rapid succession; but it is preferred to effect the result by providing means whereby the indexing mechanism may continue to operate when once thrown into operation until the turret-head has been indexed the desired number of times, as with such construction the indexing may be more rapidly performed, and this is accomplished in the construction shown by holding the bolt 172' withdrawn until cam 173 has passed said bolt the desired number of times. The preferred means for thus holding the bolt 172' withdrawn is as follows, Figs. 2, 5, 6, 7, and 13: The bar 214 is pivoted at its front end to the end of an arm 229, secured to a stud 230, pivoted in a bracket 231, secured to the frame. A second arm 232 is secured to the stud 230 and carries a shoe 234 at its free end, which is adjacent the face of gear 228. A hub or disk 235 is formed on the face of the gear 228 and is provided with a series of grooves 236, in which the plates 237 are adjustably mounted. The edge of the shoe 234 is curved and lies close to the periphery of the disk 235, as shown in Fig. 5. The number of plates 237 corresponds to the number of tools carried by the turret-head, and when any of the spindles are not to be used the plate 237 which will come in front of the shoe 234 when said tool is brought into line with the work is adjusted so that it will project beyond the periphery of disk 235. When the bar 214 is tripped to cause the turret-head to be indexed to bring said tool into position in line with the work, the stud 230 is rocked and the shoe 234 moved back away from the face of gear 228, and as the drum 220 revolves the plate 237 passes in front of said shoe 234 and prevents the return of said shoe to its normal position, and thus holds bolt 172' withdrawn until the drum 220 has been rotated a sufficient distance to carry the plate 237 past the shoe 234. The parts are so arranged that the plates 237 will not release the shoe 234 until after the cam 173 has passed the bolt 172', and the crank-roll 162 will make two revolutions before the clutch-faces 169 and 170 are disengaged. If two adjacent plates 237 are adjusted with their ends beyond the periphery of disk 235, then the crank-roll will be revolved continuously for three revolutions, since the shoe 234 is so constructed that one plate 237 does not pass said shoe until after the next succeeding plate 237 has passed in front of said shoe. By adjusting the plates 237 the bolt 172' may be held withdrawn as desired.

For revolving certain of the tools carried by the spindles—as, for instance, a threading-tool or drill—the following mechanism is provided, Figs. 1, 5, and 12: A pinion 238 is secured to the end of shaft 67 and engages a similar pinion 239, mounted on a short stud 240, secured in the bracket 241. A gear 242 is removably held on the hub of pinion 239 by means of a nut 243. The gear 242 meshes with a gear 244, removably secured on the hub of a gear 245 by means of a nut 246. The gear 245 is mounted to revolve on a stud 247, secured in the end of the shaft 154. The gear 245 is thus continuously revolved from the shaft 67, and by changing the gears 242 and 244 the speed of rotation may be varied as desired. In case the tool to be revolved is a threading-tool, such as 248, it is secured upon the end of a shaft 249, passing through one of the spindles 156 and held therein by a bushing 250, which is between a flange 251 and a collar 252, secured to said shaft. The rear end of the shaft 249 passes through a gear 253, which meshes with the gear 245, said shaft having a sliding connection with said gear by means of a spline secured to the gear, which engages a slot in the shaft. The gear 253 is mounted in a bushing 254, which is secured in a hole 255 in a disk 256, fastened to the shaft 154, said bushing being held in place by a nut 257. With this construction the shaft 249 is continuously revolved in the normal direction of the rotation of the chuck-spindle, but at a slower rate of speed, and the thread will be cut, therefore, at a speed which is the difference in speed between the chuck-spindle and the shaft 249. When the chuck-spindle is reversed, however, to run off the threading-tool, the chuck-spindle and shaft 249 will be revolving in opposite directions, and the threading-tool will be run off at a speed which is the sum of the speeds of the chuck-spindle and the shaft 249. Thus the chuck-spindle may be run at a much higher speed than would be practicable for cutting threads, and the time consumed in running the die on and off again will be the same as it would be were the die not revolved, for the reason that the time lost in threading or running on at the differential speed is gained by running off at the sum of the speeds.

In case it is desired to revolve a tool—such as a drill, for instance—in a direction opposite to that in which the chuck-spindle normally rotates a shaft 258 is mounted in one of the spindles 156 in a manner similar to shaft 249 and is connected with a gear 259, mounted on the disk 256 in a similar manner to gear 253, which gear 259 is engaged by an intermediate gear 260, Fig. 5, mounted on a stud 260', screwed into the face of disk 256 and meshing with gear 245. The disk 256 is provided with a hole 255 corresponding with each spindle and with a screw-hole corresponding to each spindle, so that as many revolving tools may be used as desired, and said tools may be revolved in either direction or arranged with relation to the other tools, as desired.

The machine is provided with two cross-slides 261 and 262, mounted in suitable ways and operated from cams 263 and 264, secured upon the end of shaft 125 outside the bearing for the shaft, Figs. 2, 7. The cam 263 engages the end of a lever or rock-arm 265, which is provided with gear-teeth 266, engaging a rack 267 upon the front slide. The cam 264 engages a lever or rock-arm 268, provided with gear-teeth 269, engaging teeth 270, formed on one arm of a bell-crank lever 271, the other arm of which is provided with teeth 272, engaging a rack 273 on slid 262. By thus mounting the cams 263 and 264 on the end of shaft 125 and outside the bearing said cams may be readily changed by slipping them on and off the end of the shaft, and by locating the cams and slide-operating levers at the front of the machine the levers may be readily operated manually by inserting a handle 274 in sockets 275, formed in the slide-operating levers.

In order to obviate any danger of breaking the parts of the machine driven from the worm-shaft 142, it is preferred to connect the change-gear 141 to said shaft by a safety device which will break when undue strain is put upon any of the parts operated from said shaft, Fig. 14. As shown, the gear 141 is secured upon a sleeve 276, which is connected to a collar 277, secured to the shaft 142 by means of a screw-pin 278, the end of which enters a recess in said collar. The screw-pin 278 is strong enough to drive shaft 142 under any normal strain, but will be sheared off if an abnormal strain is put upon said shaft, and the gear 141 will then run idly upon the shaft. It is preferred to thus connect the gear 141 to the shaft 142 by the sleeve 276 and collar 277 rather than directly to the shaft, as said parts may be readily replaced at small expense, if required.

The mechanisms driven from shaft 67 may be operated manually when desired—as, for instance, to determine whether the parts are properly timed before turning on the power—by placing a crank-handle upon the squared end of shaft 96, or the tool-spindles may be reciprocated manually by placing the crank-handle on the squared end of shaft 202, the locking-slide 172' being operated in the latter instance by a handle formed on the end of lever 178 and the turret-head being indexed by grasping the disk 256.

What I claim as my invention, and desire to secure by Letters Patent, is—

1. A spindle-reversing mechanism in a metal-working machine comprising a shifter, a spring for operating said shifter in one direction, a cam for operating said shifter in the opposite direction, and means independent of said cam for holding said spring under tension and releasing said spring, substantially as described.

2. A spindle-reversing mechanism in a metal-working machine comprising a shifting lever, a spring-operated bolt engaging said lever and operating the same in one direction, a latch for holding said bolt retracted, means for operating said latch, and a cam for operating said lever in the other direction, substantially as described.

3. In a screw-machine, the combination with a shifter for reversing the spindle, of a spring-bolt for operating said shifter in one direction, a latch for holding said shifter retracted, a cam for operating said shifter in the other direction, and retracting said bolt, a clutch for operating said cam, a device for holding said clutch out of operation, and means for tripping said device and latch, substantially as described.

4. In a screw-machine, the combination with a shifter for reversing the spindle, of a cam for operating said shifter, a driver for said cam, means for holding said driver out of operation, and a tappet for operating said holding means, substantially as described.

5. In a screw-machine, the combination with a shifter for reversing the spindle, of a cam for operating said shifter, a clutch for operating said cam, a cam carried with said clutch, and a movable abutment for engaging said cam and holding said clutch out of engagement, substantially as described.

6. In a screw-machine, the combination with a holder for a series of tools, mechanism for indexing the same and mechanism for advancing the tools during the indexing, substantially as described.

7. In a screw-machine, the combination with a turret-head for holding a series of tools, mechanism for indexing said turret-head, and mechanism for advancing the tool being brought into operative position during the indexing, substantially as described.

8. In a screw-machine, the combination with a turret-head, a series of tool-spindles mounted therein, mechanism for indexing said turret-head, and mechanism for advancing a spindle during the indexing, substantially as described.

9. In a screw-machine, the combination with a turret-head, of a series of tool-spindles mounted in said head, a guide for retaining said spindles in retracted position, and a reciprocating carrier arranged to engage a spindle while said spindle is held by said guide, substantially as described.

10. In a screw-machine, the combination with a turret-head, of a series of tool-spindles mounted in said head, a guide for retaining said spindles in retracted position, and a reciprocating carrier arranged to substantially fill the space between the ends of said guide, substantially as described.

11. In a screw-machine, the combination with a turret-head, of mechanism for indexing the same, a series of tool-spindles mounted in said head, an annular rib for guiding said spindles during the indexing, a reciprocating carrier provided with a rib registering with said annular rib and substantially filling the space between the ends of said annular rib, substantially as described.

12. In a screw-machine, the combination with a turret-head, of a series of tool-spindles mounted therein, a carrier for reciprocating said tool-spindles, a cam and connections between said cam and carrier whereby said carrier is moved by said cam, substantially as described.

13. In a screw-machine, the combination with a tool-support, of mechanism for advancing said support, mechanism for returning said support, and means whereby the advancing mechanism is rendered inactive when the returning mechanism takes effect, substantially as described.

14. In a screw-machine, the combination with a tool-support, of a cam for advancing said support, mechanism for returning said support, and means whereby the cam is rendered inactive when the returning mechanism takes effect, substantially as described.

15. In a screw-machine, the combination with a holder for a series of tools, of mechanism for indexing the same, mechanism for advancing the tools, and independent mechanism for returning said tools, substantially as described.

16. In a screw-machine, the combination with a holder for a series of tools, of mechanism for indexing the same, mechanism for moving the tools during the cutting, and independent mechanism for moving said tools during their non-cutting movement, substantially as described.

17. In a screw-machine, the combination with a holder, of a series of tool-spindles mounted to reciprocate in said holder, mechanism for indexing said holder, mechanism for moving said tool-spindles during the cutting, and independent mechanism for moving said spindles during the non-cutting movement, substantially as described.

18. In a screw-machine, the combination with a holder for a series of tools, of mechanism for indexing the same, a continuously-moving cam for advancing said tools, and intermittently-operating mechanism for returning said tools, substantially as described.

19. In a screw-machine, the combination with a turret-head, for holding a series of tools, of mechanism for indexing said head, a cam for advancing said tools, and mechanism independent of said cam for returning said tools, substantially as described.

20. In a screw-machine, the combination with a holder, a series of tool-spindles mounted in said holder, mechanism for indexing said holder, mechanism for advancing said spindles in said holder, and independent mechanism for returning said spindles, substantially as described.

21. In a screw-machine, the combination with a turret-head for holding a series of tools, of mechanism for indexing said head, a cam for advancing the tools during the cutting, a series of cams for returning the tools, and a series of adjustable cams for moving the tools up to the work, substantially as described.

22. In a screw-machine, the combination with a tool-holder for a series of tools, of an intermittently-operating mechanism for indexing the same, mechanism for advancing said tools, and mechanism operated from said indexing mechanism for returning said tools, substantially as described.

23. In a screw-machine, the combination with a turret-head, of a series of tool-spindles in said head, intermittently-operating mechanism for indexing said head, mechanism for advancing said spindles, and mechanism operated from said indexing mechanism for returning said spindles, substantially as described.

24. In a screw-machine, the combination with a carrier for reciprocating the tools, a cam for operating said carrier, means for disconnecting said cam from said carrier, and mechanism for operating said carrier when said cam is disconnected, substantially as described.

25. In a screw-machine, the combination with a carrier for reciprocating the tools, of mechanism for operating said carrier during the cutting, a series of cams for returning said carrier, and a series of adjustable cams for operating said carrier to bring the tools up to the work, substantially as described.

26. In a screw-machine, the combination with a carrier for reciprocating the tools, of a cam for operating said carrier during the cutting, means for disconnecting said cam from the carrier, and a drum carrying a series of cams for returning the carrier, and also a series of adjustable cams for operating the carrier to bring the tools up to the work, substantially as described.

27. In a screw-machine, the combination with a turret-head, of a series of tool-spindles mounted to reciprocate in said head, a carrier for reciprocating said tools, a cam for operating said carrier, connections between said cam and carrier embodying a clutch, means for disengaging said clutch, and mechanism for operating the carrier when the clutch is disengaged, substantially as described.

28. In a screw-machine, the combination of a turret-head of indexing mechanism therefor, comprising a driver, mechanism for intermittently rotating said driver, and mechanism connecting said driver and said head for starting said head with a gradually-accelerated motion and gradually decreasing the speed of said head at the end of the indexing.

29. In a screw-machine the combination with a turret-head, of mechanism for indexing the same embodying a disk provided with radial slots, a crank for engaging said slots, means for intermittently revolving said crank, and means movable independently of said crank for locking the turret-head, substantially as described.

30. In a screw-machine, the combination with a turret-head, of mechanism for indexing the same embodying a disk provided with radial slots, a crank for engaging said slots, and means for intermittently revolving said crank, substantially as described.

31. In a screw-machine, the combination with a turret-head, of mechanism for indexing the turret embodying a disk provided with radial slots, a crank arranged to enter and leave said slots when moving radially of said disk, and means for intermittently revolving said crank, substantially as described.

32. In a screw-machine, the combination with a turret-head, of mechanism for locking said turret-head, mechanism for indexing said head embodying a disk provided with radial slots, a crank arranged to enter and leave said slots when moving radially of said disk, and means for intermittently revolving said crank, substantially as described.

33. In a screw-machine, the combination with a turret-head, for holding a series of tools, mechanism for indexing said turret-head, a driver for said mechanism, a device for holding said driver out of operation, means for tripping said device, and means for holding said device out of operative position, substantially as described.

34. In a screw-machine, the combination with a turret-head, for holding a series of tools, mechanism for indexing said turret-head, a driver for said mechanism, means for throwing said driver out of operation after each indexing, and means for causing said driver to remain in operation for a plurality of indexings, substantially as described.

35. In a screw-machine, the combination with a turret-head, for holding a series of tools, of mechanism for indexing said turret-head, a driver for said mechanism, a device for holding said driver out of operation, means for tripping said device, and adjustable means for holding said device out of operative position, substantially as described.

36. In a screw-machine, the combination with a turret-head for holding a series of tools, of mechanism for indexing said turret-head, a driver for said mechanism, a device for holding said driver out of operation, means for tripping said device, and means embodying a series of adjustable plates for holding said device out of operative position, substantially as described.

37. In a screw-machine, the combination with a turret-head for holding a series of tools, of mechanism for indexing said turret-head, a driver for said mechanism, a device for holding said driver out of operation, means for tripping said device, and means operated from said indexing mechanism for holding said device out of operative position, substantially as described.

38. In a screw-machine, the combination with a turret-head, of means for indexing the same, a series of tool-supports mounted in said head, a device for successively reciprocating said tool-supports in said head, and means independent of said reciprocating device for rotating one or more of said supports, substantially as described.

39. In a screw-machine, the combination with a turret-head, of means for indexing the same, a series of tool-supports carried by said head, a device for successively reciprocating said tool-supports in said head, a gear having its axis in line with the axis of said turret-head, and a gear upon one of said tool-supports engaging said former gear, substantially as described.

40. In a screw-machine, the combination with a turret-head, and means for indexing the same, of a series of tool-supports carried by said head, means for successively reciprocating said tool-supports in said head, a gear having its axis in line with the axis of said turret-head, a gear upon one of said tool-supports, and an intermediate gear meshing with said gears, substantially as described.

41. In a screw-machine, the combination with a revolving chuck, and means for reversing said chuck, of a support for a threading-tool, and means for rotating said support in the same direction during the threading and running off, substantially as described.

42. In a screw-machine, the combination with a rotary chuck, of a support for a threading-tool, means for rotating said support, and chuck in the same direction during the threading and in opposite directions during the running off, substantially as described.

43. The combination with means for engaging the stock, of a cam, connections between said cam and engaging means embodying a lever, a pivot carried by said lever, and a screw-rod for adjusting said pivot to and from the pivot of said lever, substantially as described.

44. The combination with means for engaging the stock, of a lever connected therewith, a second lever, means for giving said second lever a definite throw, a groove in one of said levers, and an adjustable stud secured to the other lever and engaging said groove, substantially as described.

45. The combination with means for engaging the stock of a lever connected therewith, a second lever, means for giving said second lever a definite throw, a groove in one of said levers, a stud on the other lever engaging said groove and a screw-rod for adjusting said stud, substantially as described.

46. The combination with means for engaging the stock, of a lever connected therewith, a second lever, means for giving said second lever a definite throw, a groove in one of said levers, and a stud secured to the other lever and engaging said groove, and means for adjusting said stud in line with said groove when the levers are at the limit of their throw, substantially as described.

47. In a screw-machine, the combination with mechanism for intermittently feeding the stock, of means for rendering said mechanism inoperative, and means for manually feeding the stock, substantially as described.

48. In a screw-machine, the combination with means for feeding the stock, of a cam-shaft provided with a cam for operating said feeding means, mechanism for automatically operating said cam-shaft, and means for manually operating said cam-shaft, substantially as described.

49. In a screw-machine, the combination with means for feeding the stock, of a cam-shaft provided with a cam for operating said feeding means, mechanism for intermittently operating said cam-shaft, means for rendering said mechanism inoperative, and means for manually operating said cam-shaft, substantially as described.

50. In a screw-machine, the combination with a chuck-spindle, means for reversing the rotation of the spindle, and mechanism for automatically feeding the stock, operating the tools for acting upon the stock, and controlling the reversal of the spindle, of means for throwing said automatic mechanism out of operation, and means for manually controlling the reversal of the spindle, substantially as described.

51. In a screw-machine, the combination with a chuck-spindle, means for reversing the rotation of the spindle, and mechanism for feeding the stock, operating the tools for acting upon the stock, and controlling the reversal of the spindle, of a shaft from which said mechanism is operated, a clutch for driving said shaft, a catch for holding said clutch out of action, and means for operating said clutch, substantially as described.

52. In a screw-machine, the combination with a chuck-spindle, of mechanism for reversing the rotation of said spindle, levers extending to the front of the machine for controlling said mechanism, and mechanism for operating said levers, substantially as described.

53. In a screw-machine, the combination with a chuck-spindle, of mechanism for reversing the rotation of said spindle, levers extending to the front of the machine for controlling said mechanism, and adjustable tappets for operating said levers, substantially as described.

54. In a screw-machine, the combination with a chuck-spindle, a cross-slide, mechanism for automatically operating said cross-slide, embodying a cam and lever, means for rendering said automatic mechanism inoperative, and means for manually operating said lever, substantially as described.

55. In a screw-machine, the combination with a chuck-spindle, cross-slides, mechanism for automatically operating said cross-slides, embodying cams and levers, means for rendering said automatic mechanism inoperative, and means for manually operating said levers, substantially as described.

56. In a screw-machine, the combination with the chuck-spindle, of cross-slides, cams at the front of the machine, levers for operating said slides having their ends overlying said cams, substantially as described.

57. In a screw-machine, the combination with a chuck-spindle, a cross-slide, a lever for operating said slide, means for connecting a handle with said lever, and a cam at the front of the machine engaging said lever, substantially as described.

58. In a screw-machine, the combination with a shaft, of a collar secured thereto, a sleeve connected with said collar, by a comparatively weak pin, and a gear secured to said sleeve, substantially as described.

59. The combination, with means for engaging the stock, of a cam, a connection between said cam and engaging means, said connection embodying two parts each provided with a groove or slot, one of said parts being a lever and the two parts being pivotally connected by a stud adjustable in said grooves, said grooves standing at an angle to each other when the lever is at one end of its throw and parallel to each other when the lever is at the other end of its throw.

60. In a screw-machine, the combination of a turret, a series of tool-spindles mounted in said turret, and provided with projecting means, a reciprocating carrier adapted to engage said projecting means, means to rotate said turret whereby said reciprocating carrier is caused to successively engage with and reciprocate each spindle, a transverse guideway adapted to be engaged by said projecting means, and means for guiding said spindles in their longitudinal movement, substantially as described.

61. In a screw-machine, the combination of a turret, a series of tool-spindles mounted in said turret, each of said spindles being provided with two projections, one on each side thereof, reciprocating means adapted to engage one of said projections, means to intermittently rotate said turret whereby said reciprocating means is caused to successively engage with and reciprocate each spindle, a transverse guideway and a longitudinal guideway, said transverse guideway being adapted to be engaged by one of the projections on the spindle, and the longitudinal guideway being adapted to be engaged by the other projection, substantially as described.

62. In a screw-machine, the combination of a turret, a series of tool-spindles mounted in said turret, each of said spindles being provided intermediately of the extremities with two projections, one on each side thereof, reciprocating means adapted to engage one of said projections, means to intermittently rotate said turret, a transverse guideway and a longitudinal guideway, said transverse guideway being adapted to be engaged by one of the projections on the spindle, and the longitudinal guideway being adapted to be engaged by the other projection, substantially as described.

63. In a screw-machine, the combination of a plurality of tool-spindles, means for intermittently revolving said spindles about an axis so as to successively bring each tool into operative position, a guideway arranged transversely of the axis of revolution of the spindles, a second guideway arranged longitudinally with respect to said axis, said spindles being provided with two projections, one on each side thereof, one of said projections adapted to traverse said transverse guideway and the other of said projections adapted to traverse said longitudinal guideway, and means for reciprocating said last-named projection in said longitudinal way, substantially as described.

64. In a screw-machine, the combination of a plurality of tool-spindles, means for intermittently revolving said spindles about an axis so as to successively bring each tool into operative position, a guideway arranged transversely of the axis of revolution of the spindles, a second guideway arranged longitudinally with respect to said axis, and separate from said transverse guideway, said spindles being provided with two projections, one on each side thereof, one of said projections adapted to traverse said transverse guideway and the other of said projections adapted to traverse said longitudinal guideway, and means for reciprocating said last-named projection in said longitudinal way, substantially as described.

CHARLES R. GABRIEL.

Witnesses:
W. H. THURSTON,
IRA L. FISH.